United States Patent
Kitai et al.

(10) Patent No.: US 6,511,398 B2
(45) Date of Patent: Jan. 28, 2003

(54) METHOD AND APPARATUS FOR CONTROLLING ENGINE BRAKE OF VEHICLE

(75) Inventors: Haruo Kitai, Akashi (JP); Yoshikazu Sakakihara, Akashi (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/115,957

(22) Filed: Apr. 5, 2002

(65) Prior Publication Data

US 2002/0145334 A1 Oct. 10, 2002

(30) Foreign Application Priority Data

Apr. 9, 2001 (JP) ........................ 2001-109813

(51) Int. Cl.$^7$ ..................... F16H 59/00; F16H 61/26; B60K 41/00
(52) U.S. Cl. ..................... 477/44; 477/46; 180/376
(58) Field of Search ................. 180/336, 376; 303/190, 197; 477/41, 44, 46; 474/19

(56) References Cited

U.S. PATENT DOCUMENTS

2002/0056586 A1 * 5/2002 Kawamoto et al. ......... 180/336
2002/0096386 A1 * 7/2002 Kawamoto et al. ......... 180/376
2002/0098942 A1 * 7/2002 Kuji et al. .................. 477/47
2002/0119846 A1 * 8/2002 Kitai et al. .................. 474/14

FOREIGN PATENT DOCUMENTS

JP      A 11-165686      6/1999

* cited by examiner

Primary Examiner—Christopher P. Schwartz
(74) Attorney, Agent, or Firm—Oliff & Berridge, PLC

(57) ABSTRACT

In an engine brake control method for a vehicle provided with a variable-speed V-belt drive including a drive pulley having a movable sheave, a driven pulley, and a V belt extended between the drive pulley and the driven pulley, a position of an engine brake regulating member is detected by a detector. The engine brake regulating member limits an extent of an outward axial movement of the movable sheave of the drive pulley so as to regulate a maximum V-groove width of the drive pulley. A position of the engine brake regulating member is controlled by a controller based on a position signal sent from the detector to the controller. The controller operates an actuator to move the engine brake regulating member so that the engine brake regulating member is located at a desired position relative to the movable sheave of the drive pulley.

12 Claims, 13 Drawing Sheets

METHOD AND APPARATUS FOR CONTROLLING ENGINE BRAKE OF VEHICLE

BACKGROUND OF THE INVENTION

1. Field of the Invention

The present invention relates to a method and an apparatus for controlling an engine brake of a vehicle provided with a variable-speed V-belt drive.

2. Description of the Related Art

Vehicles provided with a variable-speed V-belt drive include all-terrain four-wheel vehicles. Such a variable-speed V-belt drive for a vehicle in capable of exercising what in called a belt clutch function which intercepts power transmission from a drive pulley to a belt extended between the drive pulley and a driven pulley, while the engine of the vehicle is stopped or in an idling operation.

The vehicle provided with such a variable-speed V-belt transmission capable of exercising a belt clutch function is unable to use engine brake when traveling down a slope because the engine is disconnected from the transmission when the engine speed decreases below a certain level.

A variable-speed V-belt drive disclosed in JP-A 165686/1999 for a vehicle is capable of automatically applying or taking off engine brake under a predetermined condition relating to, for examples traveling speed. The variable-speed V-belt drive is provided with a traveling-speed sensor, and an engine brake regulating lever for regulating the maximum V-groove width of the drive pulley. The engine brake regulating lever limits the reduction of the pitch diameter of the drive pulley when the traveling speed is above a certain level and the engine is idling so that the drive pulley and the belt are engaged effectively to make engine brake effective even while the engine is idling. This variable-speed V-belt drive is capable of applying or taking off engine brake according to acceleration or the like.

An engine brake control method mentioned in JP-A 165686/1999 moves the engine brake regulating lever between an engine brake applying position and an engine brake taking-off position to apply or take off engine brake by changing the maximum V-groove width of the drive pulley. The engine brake applying position for the engine brake regulating lever to apply engine brake is fixed. Therefore, the effect of engine bake changes with changes in the positional relation between the engine brake regulating lever and the movable sheave of the drive pulley with respect to the axial direction or the axial play of the V belt relative the movable sheave of the drive pulley after the variable-speed V-belt drive has been used for a certain service time.

The effect of engine brake decreases with the decrease of pressure applied to the V belt by the movable sheave of the drive pulley due to the wear of the V belt or the abrasion of the working surface of the engine brake regulating lever.

SUMMARY OF THE INVENTION

Accordingly, it is an object of the present invention to provide engine brake control method and apparatus capable of making engine brake effective or ineffective as the need arises, and of withholding the effect of engine brake from changing according to change in engine speed while engine brake is applied to maintain a fixed engine-braking effect. Moreover, it is another object to maintain a fixed engine-braking effect regardless of change in the pressure applied by the movable sheave of the drive pulley to the V belt due to the wear of the V belt and the abrasion of the associated parts.

According to the first aspect of the present invention, an engine brake control method for a vehicle provided with a variable-speed V-belt drive including a drive pulley having a movable sheave, a driven pulley, and a V belt extended between the drive pulley and the driven pulley, comprises: detecting a position of an engine brake regulating member by a detector, the engine brake regulating member listing an extent of an outward axial movement of the movable sheave of the drive pulley so an to regulate a maximum V-groove width of the drive pulley; and controlling a position of the engine brake regulating member by a controller based on a position signal sent from the detector to the controller, the controller operating an actuator to move the engine brake regulating member so that the engine brake regulating member is located at a desired position relative to the movable sheave of the drive pulley.

According to the present invention, when engine brake is applied to the vehicle, the dislocation of the engine brake regulating member from a correct position can be automatically corrected to maintain the effect of engine brake constant.

Preferably, the detecting step detects a reference position of the engine brake regulating member where the engine brake regulating member is located when the engine brake regulating member comes into contact with the movable sheave. The controlling step controls a position of the engine brake regulating member using the reference position detected in the detecting step an a reference.

Thus, even after the variable-speed V-belt drive has been used for a long service time, the maximum V-groove width of the drive pulley can be easily adjusted without requiring manual adjustment according to the existing position and dimensions of the movable sheave of the drive pulley.

Preferably, the detecting step detects a reference position of the engine brake regulating member where the engine brake regulating member is located when the movable sheave, which is pressed inward by the engine brake regulating member, comes into contact with the V belt. The controlling step controls a position of the engine brake regulating member using the reference position detected in the detecting step as a reference.

Thus, the position of the movable sheave of the drive pulley for the maximum V-groove width of the drive pulley can be determined regardless of clearance between the movable sheave of the drive pulley and the V belt, which further enhances the effect on maintaining the effect of engine brake constant.

Preferably, the detecting step is executed when a main switch of the vehicle is opened.

Thus, the working position of the engine brake regulating member can be automatically corrected when the operation of the vehicle is stopped so that the engine brake regulating member can be always held at a proper position to prevent the reduction of the effect of engine brake. Since the position of the engine brake regulating member is not detected when the main switch is closed, the vehicle is able to start without any time lag due to the detection of the position of the engine brake regulating member after the main switch has been closed.

Preferably, the actuator is electrically driven.

According to the second aspect of the present invention, an engine brake control apparatus for a vehicle provided with a variable-speed V-belt drive including a drive pulley having a movable sheave, a driven pulley, and a V belt extended between the drive pulley and the driven pulley, comprises: an engine brake regulating member of limiting an extent of an outward axial movement of the movable sheave of the drive pulley so as to regulate a maximum V-groove width of the drive pulley; a detector of detecting a position of the engine brake regulating member; an actuator of moving the engine brake regulating member; and a controller of controlling a position of the engine brake regulating member by operating the actuator based on a position signal sent from the detector so that the engine brake regulating member is located at a desired position relative to the movable sheave of the drive pulley.

According to the present invention, when engine brake is applied to the vehicle, the dislocation of the engine brake regulating member from a correct position can be automatically corrected to maintain the effect of engine brake constant.

Preferably, the detector detects a reference position of the engine brake regulating member where the engine brake regulating member is located when the engine brake regulating member comes into contact with the movable sheave. The controller controls a position of the engine brake regulating member using the reference position detected by the detector as a reference.

Thus, even after the variable-speed V-belt drive has been used for a long service time, the maximum V-groove width of the drive pulley can be easily adjusted without requiring manual adjustment according to the existing position and dimensions of the movable sheave of the drive pulley.

Preferably, the detector detects a reference position of the engine brake regulating member where the engine brake regulating member is located when the movable sheave, which is pressed inward by the engine brake regulating member, comes into contact with the V belt. The controller controls a position of the engine brake regulating member using the reference position detected by the detector as a reference.

Thus, the position of the movable sheave of the drive pulley for the maximum V-groove width of the drive pulley can be determined regardless of clearance between the movable sheave of the drive pulley and the V belt, which further enhances the effect on maintaining the effect of engine brake constant.

Preferably, the detector detects the position of the engine brake regulating member when a main switch of the vehicle is opened.

Thus, the working position of the engine brake regulating member can be automatically corrected when the operation of the vehicle is stopped so that the engine brake regulating member can be always held at a proper position to prevent the reduction of the effect of engine brake. Since the position of the engine brake regulating member is not detected when the main switch is closed, the vehicle is able to start without any time lag due to the detection of the position of the engine brake regulating member after the main switch has been closed.

Preferably, the actuator is electrically driven.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
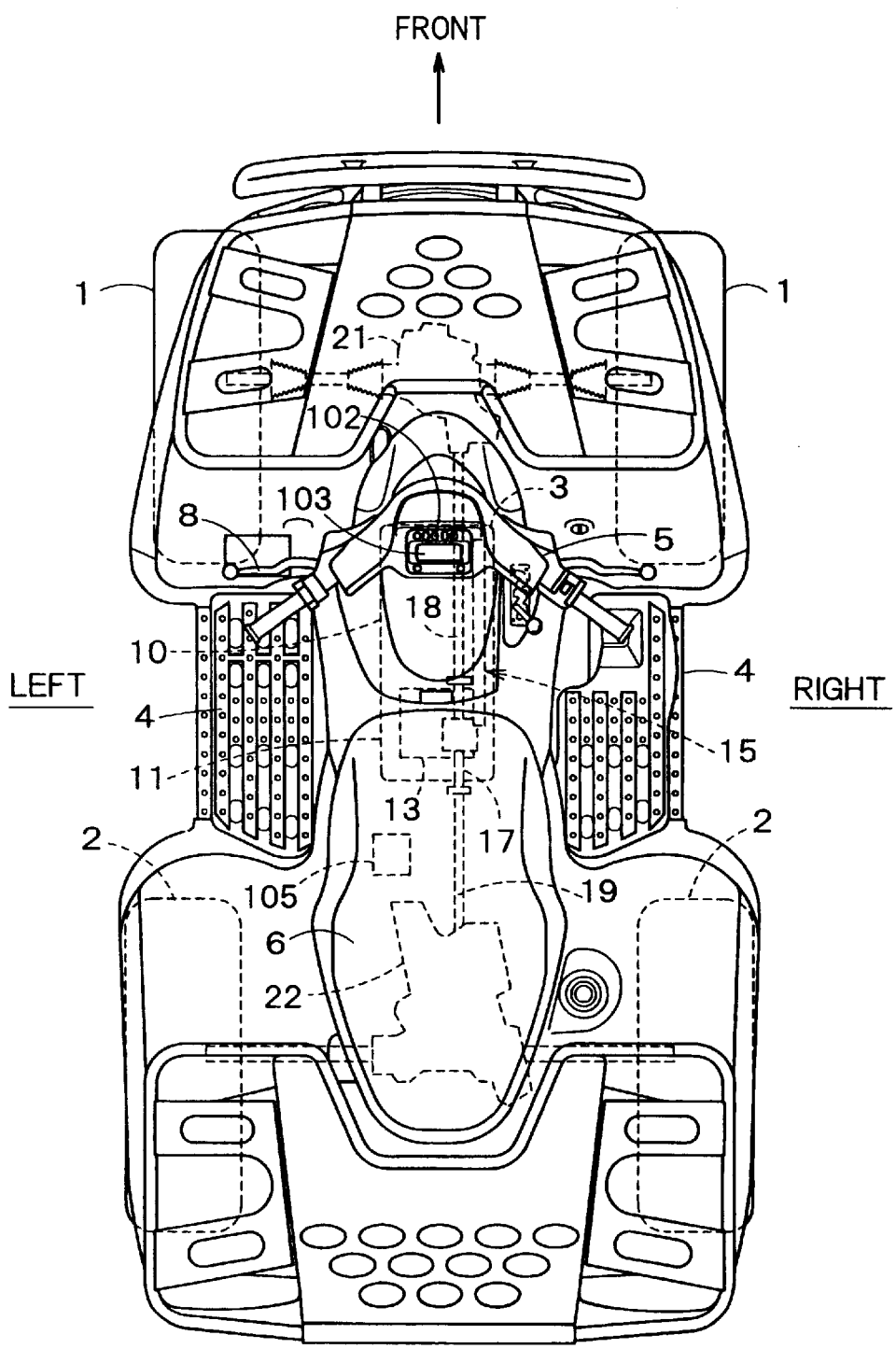
FIG. 1 is a plan view of a straddle type all-terrain four-wheel vehicle to which the present invention may be applied.

FIG. 1 is a plan view of a straddle-type all-terrain four-wheel vehicle (hereinafter, referred to simply as "all-terrain vehicles"). In the following description, words "right", "left", "front" "rear" and the like words signify positional and directional attributes with respect to the direction of forward travel of the all-terrain vehicle.

Construction of the all-terrain vehicle will be described with reference to FIG. 1. The all-terrain vehicle has a body frame, a pair of front wheels 1 and a pair of rear wheels 2 supported on the body frame, an engine 3 mounted on a part of the body frame between the front wheels 1 and the rear wheels 2, and steps 4 disposed on the right and the left side of the engine 3, respectively. A handlebar 5 is supported on an upper front part of the body frame, and a straddle-type seat 6 is disposed behind the handlebar 5. Meters including a speed meter 103, and pilot lamps 102 including a two-wheel-drive mode indicating lamp, a four-wheel-drive mode indicating lamp and an abnormal engine brake warning lamp are arranged in a middle part of the handlebar 5. A controller 105 for controlling engine brake is disposed under the seat 6.

A crankcase 10 included in the engine 3 extends rearward, and a transmission case 11 is joined to the rear end of the crankcase 10. A gear transmission 13 is built in the transmission case 11. A variable-speed V-belt drive 15 is disposed on the right side of the crankcase 10. The output power of the engine 3 is transmitted through the variable-speed V-belt drive 15 to the gear transmission 13.

A longitudinal drive shaft 17 is extended under the transmission case 11. The drive shaft 17 has a front end connected to a front propeller shaft 18, and a rear end connected to a rear propeller shaft 19. The front propeller shaft 18 has a front end part interlocked with a front reduction gear built in a front reduction gear case 21. The rear propeller shaft has a rear end part interlocked with a rear reduction gear built in a rear reduction gear case 22.

Figure 2:
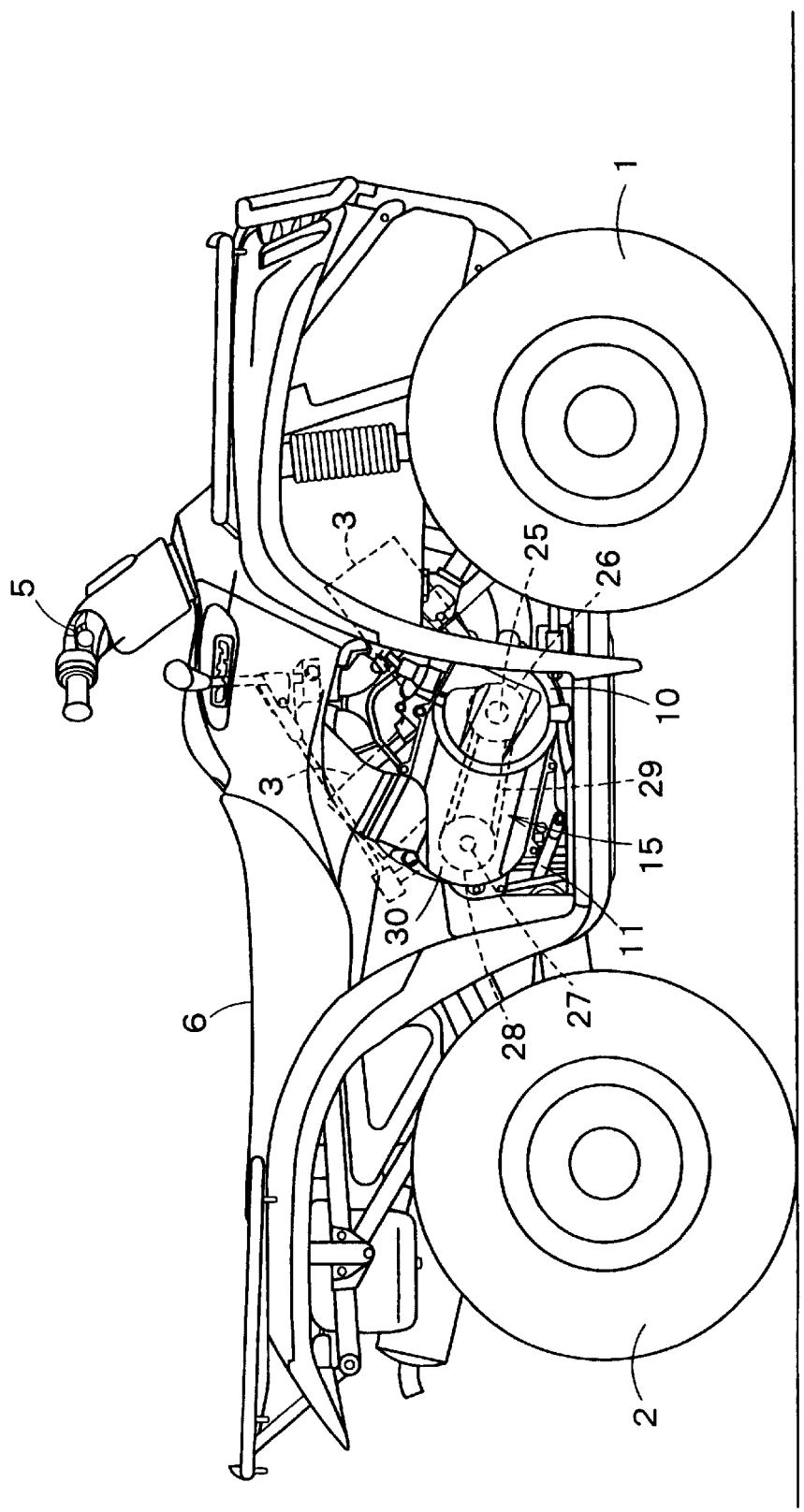
FIG. 2 is a side elevation of the straddle type all-terrain four-wheel vehicle, showing the right side of the straddle type all-terrain four-wheel vehicle.

Referring to FIG. 2, the engine 3 is a two-cylinder v-engine. The variable-speed V-belt drive 15 has a drive pulley 26 on the front side, a driven pulley 28 on the rear side, and a V belt 29 extended between the pulleys 26 and 28. The variable-speed V-belt drive 15 is covered with a V-belt drive cover 30.

[Variable-speed V-belt Drive]

Figure 5:
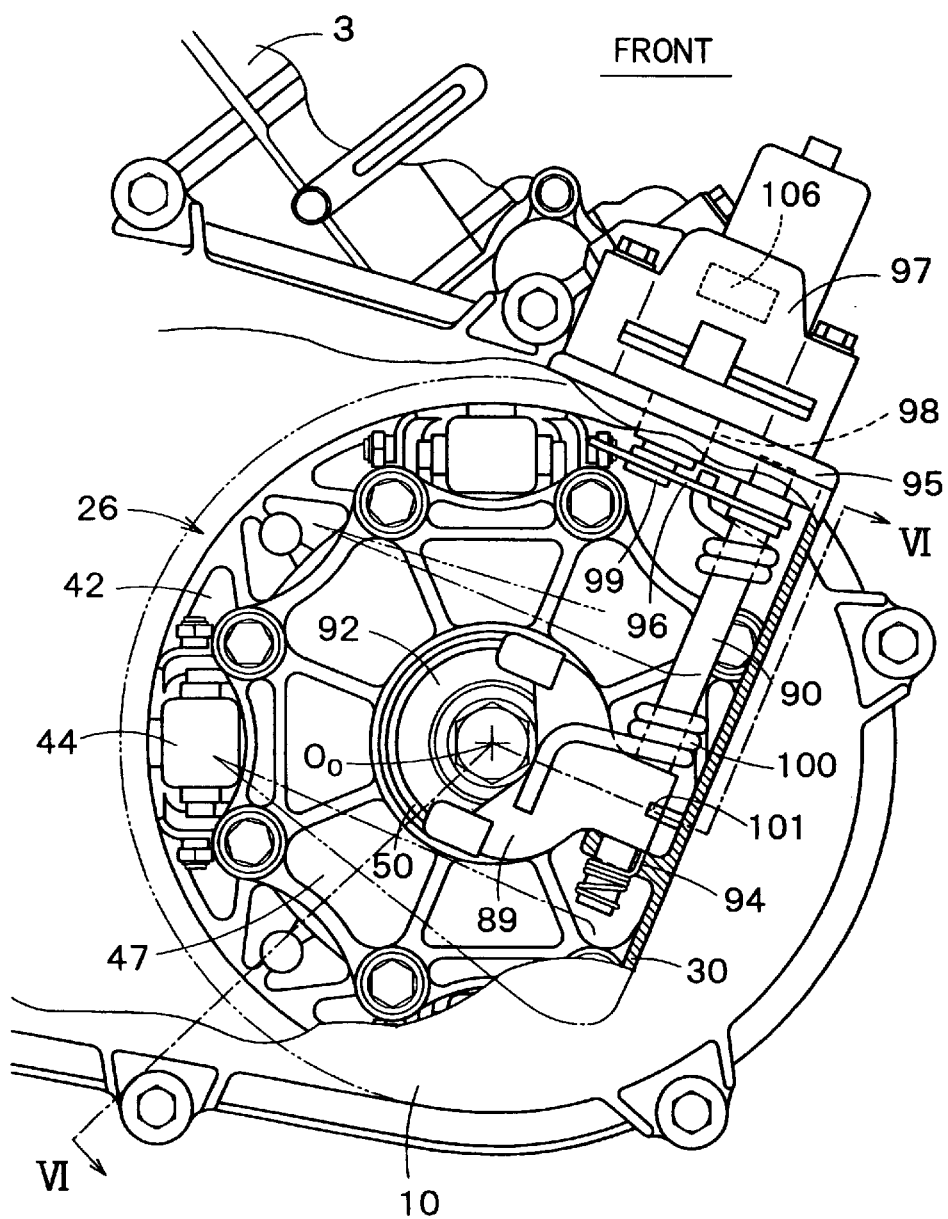
FIG. 5 is a side elevation of a drive pulley combined with an engine brake controlling apparatus according to an embodiment of the present invention.
Figure 6:
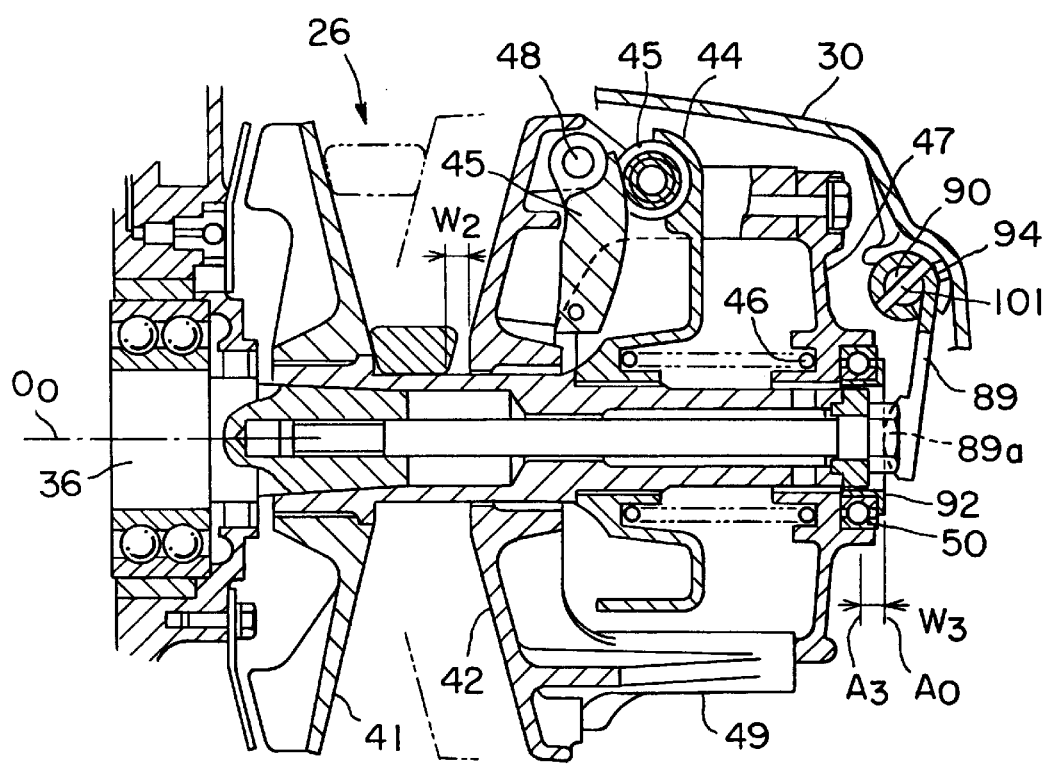
FIG. 6 is a sectional view taken on line VI—VI in FIG. 5.

Referring to FIG. 6, which is a sectional view taken on line VI—VI in FIG. 5, showing a crankshaft 36 and associated parts in a sectional view in a plane including the axis $O_0$ of the crankshaft 36, a drive shaft 25 holding the drive pulley 26 thereon is joined to a right end part pf the crankshaft 36 coaxially with the crankshaft 36. The drive pulley 26 has a fixed sheave 41 and a movable sheave 42 disposed axially opposite to the fixed sheave 41. The fixed sheave 41 is fixedly mounted on the drive shaft 25 and is restrained from turning and axial movement relative to the drive shaft 25. The movable sheave 42 is connected to the drive shaft 25 by a spider 44 for rotation together with the drive shaft 25 and is axially movable on the drive shaft 25.

A thrust mechanism including the spider 44, a plurality of flyweights 45, a pressure spring 46, and a support plate 47 is disposed on the back side of the movable sheave 42. The flyweights 45 are supported pivotally by pins 48 on the back side of the movable sheave 42. As the rotating speed of the drive shaft 25 increases, the flyweights 45 turn away from the back surface of the movable sheave 42 on the pins 48. Connecting arms 49 extend to the right from the back surface of the movable sheave 42 through the spider 44, and the support plate 47 is fastened to the right ends of the connecting arms 49. The support plate 47 is mounted axially slidably on the drive shaft 25. A bearing 50 is fitted in a central boss formed on the support plate 47. A flanged collar 92 is fitted in the inner race of the bearing 50. The flanged collar 92, the bearing 50 and the support plate 47 fastened to the connecting arms 49 move axially on the drive shaft 25 together with the movable sheave 42. Therefore, the flanged collar 92, the bearing 50 and the support plate 47 will be called movable components.

The spider 44 is disposed on the right side of the movable sheave 42 and is fastened to the drive shaft 25. The spider 44 is provided with pressure-receiving rollers 52 in contact with the flyweights 45, respectively. The pressure spring 46 is compressed between the spider 44 and the support plate 47 so as to bias the support plate 47 to the right to bias the movable sheave 42 to the right indirectly through the connecting arm 49. Thus, the pressure spring 46 biases the movable sheave 42 of the drive pulley 26 away from the fixed sheave 41 of the same. When the flyweights 45 turn away from the back side of the movable sheave 42 as engine speed increases, the movable sheave 42 is moved to the left together with the support plate 47 against the resilience of the pressure spring 46 by reaction force acting on the pressure-receiving rollers 52 to compress the V belt 29 between the sheaves 41 and 42 of the drive pulley 26.

Figure 3:
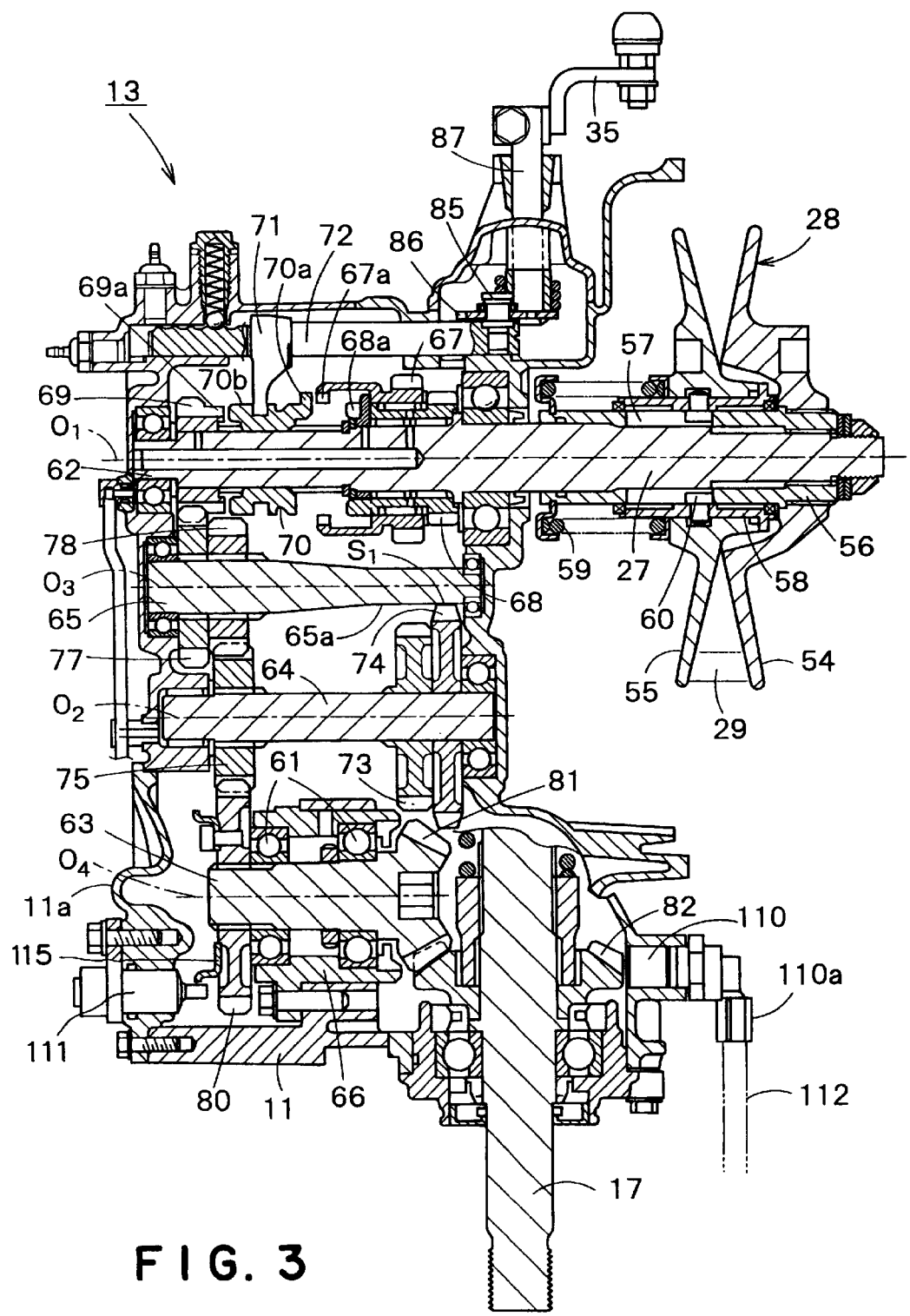
FIG. 3 is a sectional development of a gear transmission.

Referring to FIG. 3, the driven pulley 28 of the variable-speed V-belt drive 15 has a fixed sheave 54, and a movable sheave 55 disposed on the left side of the fixed sheave 54 axially opposite to the same. The fixed sheave 54 is fixedly mounted on a cylindrical cam 56 fixedly mounted on a driven shaft 27, and is restrained from rotation and axial movement relative to the cylindrical cam 56. The cylindrical can 56 is provided with spiral cam grooves 57. A sleeve 58 is fixedly fitted in the bore of the movable sheave 55. The sleeve 58 is put on the cylindrical cam 56 so as to be rotatable and axially movable relative to the cylindrical cam 56. The movable sheave 55 is biased toward the fixed sheave 54 by a pressure spring 59. Follower rollers 60 supported on the sleeve 58 are engaged slidably in the cam grooves 57.

As a torque transmitted by the V belt 29 to the driven pulley 28 increases, the movable sheave is 15 turned in the rotating direction of the driven pulley 28. Consequently, the action of the cam grooves 57 on the follower rollers 60 causes the movable sheave 55 to move toward the fixed sheave 54, so that pressure acting on the V belt 29 increases.

[Gear Transmission]

Figure 4:
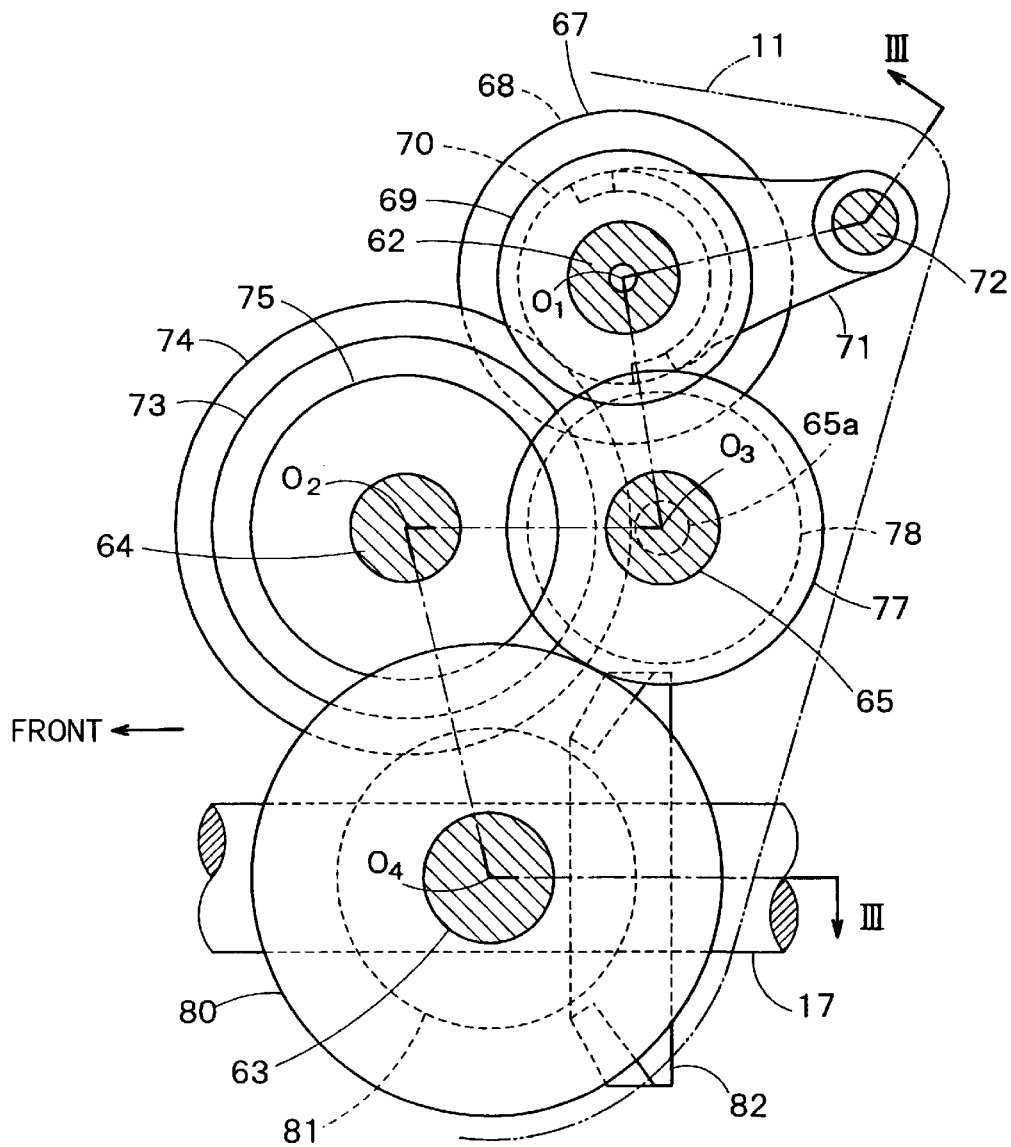
FIG. 4 is a schematic side elevation of the gear transmission.

Referring to FIG. 4, a transmission input shaft 62 having an axis $O_1$ is extended laterally in an upper region in the transmission case 11. A transmission output shaft 63 having an axis $O_4$ is extended in parallel to the input shaft 62 in a lower end region in the transmission case 11. A counter shaft 64 having an axis $O_2$ and a reverse idle shaft 65 having an axis $O_3$ are disposed in parallel to the input shaft 62 between the input shaft 62 and the output shaft 63. A shift rod 72 is disposed in parallel to the input shaft 62 at a position obliquely above and behind the input shaft 62.

FIG. 3 is a sectional view taken on line III—III in FIG. 4, i.e., a sectional view in planes including the axes $O_1$, $O_2$, $O_3$ and $O_4$.

The transmission input shaft 62 is formed integrally with the driven shaft 27 supporting the driven pulley 28 thereon. A forward high-speed gear 65, forward low-speed gear 68 and a reverse gear 69 are mounted an the input shaft 62. A shift sleeve 70 is mounted on and splined to the transmission input shaft 62. The shift sleeve 70 is axially movable on the transmission input shaft 62. The reverse gear 69 is provided on its right end surface with projections 69a and is supported for rotation by a needle bearing on the transmission input shaft 62. The forward low-speed gear 63 has a boss extending to the left from its left end surface and projections 68a are formed in the left end surface of the boss of the forward low-speed gear 68. The boss of the forward low-speed gear 68 is supported for rotation in a needle bearing. The forward high-speed gear 67 has arms extending to the left and provided at their extremities with projections 67a, and is supported for rotation by a needle bearing on the boss of the forward low-speed gear 68. Forward projections 70a and reverse projections 70b are formed in the right and the left end surface of the shift sleeve 70, respectively.

A shift fork 71 is engaged in an annular groove formed in the outer circumference of the shift sleeve 70. The shift fork 71 is fixed to the shift rod 72 supported for axial movement on the transmission case 11. A change pin 85 projects upward from a right end part of the shift rod 72, and an internal change lever 96 is engaged with the change pin 85 and is connected to an external change lever 35 by a change lever shaft 87.

A forward intermediate gears 73 and 74 are fixedly mounted on the counter shaft 64 and are engaged with the forward high-speed gear 67 and the forward low-speed gear 68, respectively. An intermediate output gear 75 is fixedly mounted on the counter shaft 64.

A first reverse idle gear 77 of a large diameter and a second reverse idle gear 78 of a small diameter are fixedly mounted on the reverse idle shaft 65 and are engaged with the reverse gear 69 and the intermediate output gear 75, respectively.

The intermediate output gear 75 is engaged with an output gear 80 fixedly mounted on a left end part of the output shaft 63. A drive bevel gear 81 formed integrally with a right end part of the output shaft 63 is engaged with a driven bevel gear 82 fixedly mounted on the drive shaft 17.

In the gear transmission, a speed sensor 110 is disposed opposite to the outer circumference of the driven bevel gear 82 fixedly mounted on the drive shaft 17. A traveling direction sensor 111 is disposed opposite to a traveling direction indicating disk 115 fixed to the output gear 80.

[Engine Brake Control Mechanism]

Referring to FIG. 6, an engine brake regulating lever 89 for controlling engine brake is disposed on the right side of the support plate 47 of the drive pulley 26. The engine brake regulating lever 89 is fastened to a shaft 90 with a fastening pin 101. The shaft 90 is supported for turning on a protrusion 94 formed in the V-belt drive cover 30. A working end provided with contact surfaces 89a of the engine brake regulating lever 89 is disposed opposite to the flanged collar 92 fitted in the bearing 50 so as to be brought into contact with the flanged collar 92. The engine brake regulating lever 89 can be turned about the axis of the shaft 90 to shift the contact surfaces 89a along the axis of the flanged collar 92. Consequently, the support plate 47 is shifted together with the movable sheave 42 of the drive pulley 26 relative to the fixed sheave 41 of the same to change the maximum V-groove width of the drive pulley 26. That is, the contact surfaces 89a of the engine brake regulating lever 89 are moved axially from an engine brake taking-off position $A_0$ to the left by a distance $W_3$ to shift the movable sheave 42 to the left through the flanged collar 92, the bearing 50, the support plate 47 and the connecting arms 49 by a distance $W_2$ (FIG. 7) so that the V belt 29 may be compressed between the fixed sheave 41 and the movable sheave 42 to make engine brake effective.

Referring to FIG. 5 showing the right side of the drive pulley 26 and the associated parts, the working end of the engine brake regulating lever 89 is bifurcated into two arm lying diametrically opposite to each other with respect to the axis $O_0$ of the crankshaft 36. The shaft 90 has a lower end supported for turning on the projection 94 of the V-belt drive cover 30 and an upper end supported for turning on a motor case 95. A turning link 96 has one end fixed to the upper end of the shaft 90 and the other end connected to an eccentric pin 99 fixed to a drive shaft 98 included in an electric motor 97 (electric actuator). A torsion coil spring 100 is wound around a part of the shaft 90 between the engine brake regulating lever 89 and the turning link 96. The torsion coil spring 100 biases the engine brake regulating lever 89 toward the flanged collar 92 to prevent the free turning of the engine brake regulating lever 89 relative to the shaft 90 due to the loose fitting of the fixing pin 101 in holes formed in the engine brake regulating lever 89 and the shaft 90.

The electric motor 97 is provided internally with a potentiometer (dectector) 106. The potentiometer 106 converts the angular position and angle of turning of the drive shaft 98 of the electric motor 97 into corresponding voltages.

Figure 7:
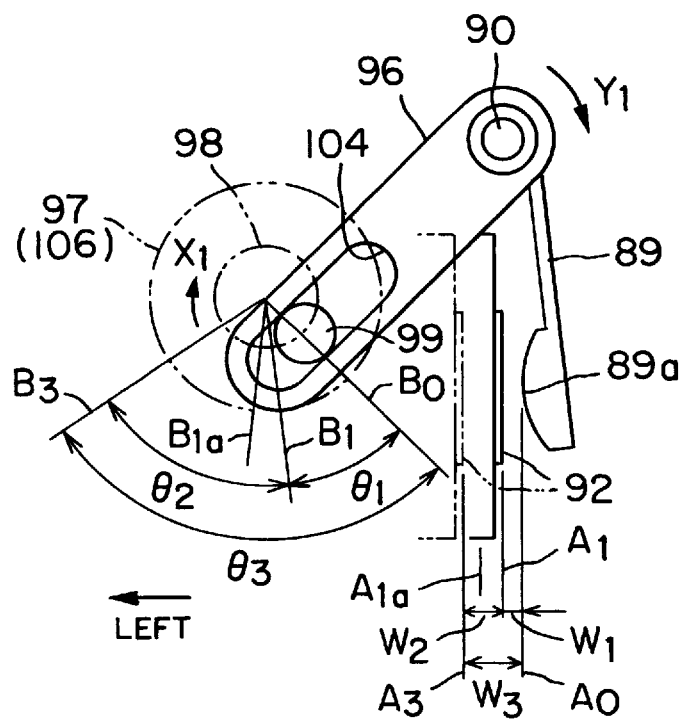
FIG. 7 is a plan view of an engine brake regulating lever, a shaft and a swing link in a state where engine brake is taken off.
Figure 8:
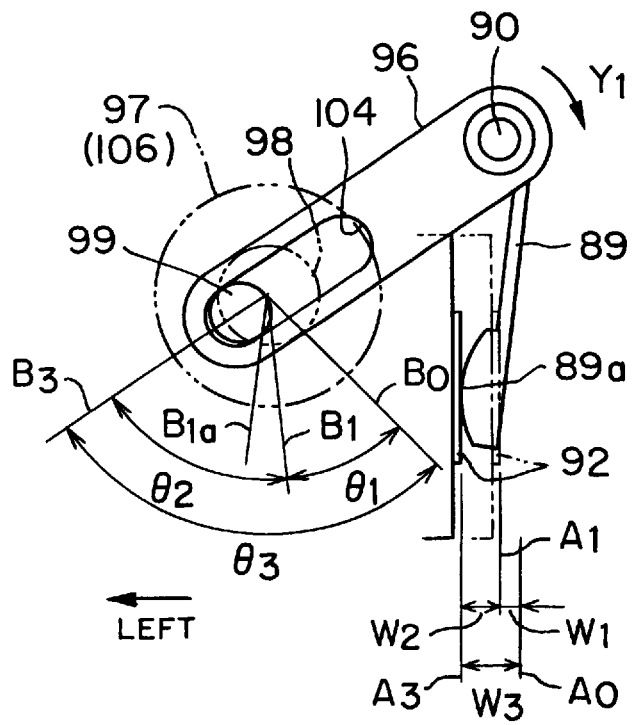
FIG. 8 is a plan view of the engine brake regulating lever, the shaft and the swing link in a state where engine brake is applied.

FIG. 7 is a top view of the engine brake regulating lever 89, the shaft 90 and the turning link 96. The eccentric pin 99 attached to the drive shaft 98 is engaged in a slot 104 formed in the turning link 96. The drive shaft 98 turns to displace the contact surfaces 89a of the engine brake regulating lever 89 by turning the engine brake regulating lever 89 through the eccentric pin, the turning link 96 and the shaft 90. FIG. 7 shows a state where the engine brake is ineffective, in which the eccentric pin 99 attached to the drive shaft 98 is at an engine brake taking-off angular position $B_0$, and the contact surfaces 89a of the engine brake regulating lever 89 are spaced from the flanged collar 92 to the right and is held at the engine brake taking-off position $A_0$. The drive shaft 98 is turned in the direction of the arrow $X_1$ to turn the eccentric pin 99 from the engine brake taking-off angular position $B_0$ to an engine brake applying angular position $B_3$. Consequently, the contact surfaces 89a of the engine brake regulating lever 98 are shifted from the engine brake taking-off position $A_0$ to the left, are brought into contact with the flanged collar 92 at a reference position $A_1$, and are moved together with the bearing 50 and the support plate 47 to an engine brake applying position $A_3$ to make engine brake effective. When drive shaft 98 is turned to turn the eccentric pin 99 to a reference angular position $B_1$, the contact surfaces 89a are located at the reference position $A_1$.

The angle $\theta_3$ between the reference angular position $B_1$ and the engine brake applying angular position $B_1$ corresponds to the distance $W_2$ between the reference position $A_3$ and the engine brake applying position $A_3$. Thus, the movable sheave 42 of the drive pulley 26 is moved axially to the left from the belt releasing position to compress the V belt 29 between the fixed sheave 41 and the movable sheave 42 of the drive pulley 26 by shifting the contact surfaces 89a from the reference position $A_1$ to the engine brake applying position $A_2$.

[Engine Brake Control System]

Figure 9:
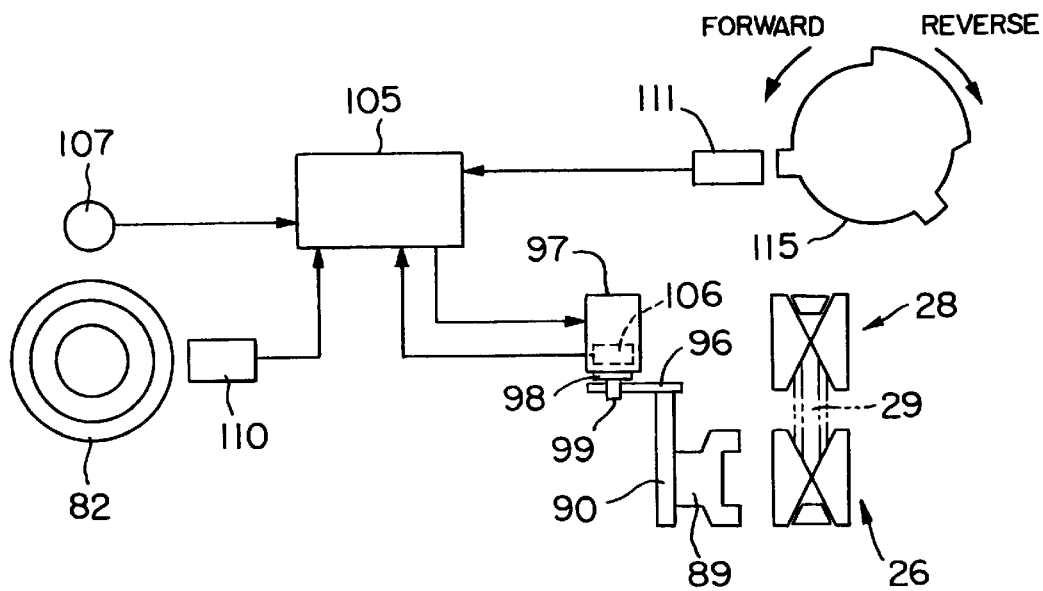
FIG. 9 is a diagrammatic view of the engine brake controlling apparatus according to the embodiment of the present invention.

Referring to FIG. 9, the controller 105 has an output unit and an input unit. A driver for driving the electric motor 97 is connected to the output unit of the controller 105. The potentiometer 106 included in the electric motor 97, the speed sensor 110, the traveling direction sensor 111 and the main switch 107 of the vehicle are connected to the input unit of the controller 105. The potentiometer 106 converts the angular position and angle of turning of the drive shaft 98 of the electric motor 97 into corresponding voltages, and gives signals representing the angular position and angle of turning of the drive shaft 98 to the controller 105. The speed sensor 110 and the traveling direction sensor 111 sense the variation of magnetic flux around their sensing elements and generate a speed signal and a traveling direction signal, i.e., electric pulse signals, and sends the same to the controller 105. A signal representing the condition of the main switch 107 is given to the controller 105, and the controller 105 provides a learning operation command signal requesting the electric motor 97 to perform a learning operation.

Figure 10:
FIG. 10 is a waveform chart of a traveling direction indicating signal in a state where the vehicle is in forward travel.
Figure 11:
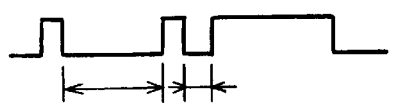
FIG. 11 is a waveform chart of a traveling direction indicating signal in a state where the vehicle is in reverse travel.

The traveling direction indicating disk 115 associated with the traveling direction sensor 111 is provided with three protrusions arranged at different angular intervals. The traveling direction sensor 111 provides a forward travel signal of a waveform shown in FIG. 10 while the vehicle is in forward travel, and provides a reverse travel signal of a waveform shown in FIG. 11 while the vehicle is in reverse travel.

[Engine Brake control Mechanism Control Method]

Voltages representing the engine brake taking-off angular position $B_0$ corresponding to the engine brake taking-off position $A_0$ of the engine brake regulating lever 89, the angle $\theta_2$ corresponding to the distance $W_2$, and the reference angular position $B_1$ corresponding to the reference position $A_1$ are stored beforehand in a storage device included in the controller 105. The angular position of the eccentric pin 99 attached to the drive shaft 98 of the electric motor 97, and the angle through which the eccentric pin 99 is to be turned are controlled on the basis of conditions sensed by the sensors 110 and 111, and the condition of the main switch 107 according to the variation of the output voltage of the potentiometer 106 to control the position and the moving distance of the contact surfaces 89a of the engine brake regulating lever 89. Such operations are controlled by the following control programs.

(1) Fixed Engine-braking Effect Maintenance Control

The angular position of the eccentric pin 99 attached to the drive shaft 98 of the electric motor 97, and an angle through which the eccentric pin 99 has been turned shown in FIG. 7 are measured successively by the potentiometer 106. The potentiometer 106 gives signals to the controller 105 to control the electric motor 97 so that the engine brake regulating lever 89 is stopped correctly at the engine brake applying position $A_3$ corresponding to the engine brake applying angular position of the eccentric pin 99 attached to the drive shaft 98 of the electric motor 97 or at the engine brake taking-off position $A_0$ corresponding to the engine brake taking-off angular position $B_4$ of the eccentric pin 99 attached to the drive shaft 98 of the electric motor 97.

(2) Control of Learning Operation of Electric Motor

Referring to FIG. 9, the controller 105 gives a learning operation command signal to the electric motor 97 when the main switch 107 is opened. Then, the electric motor 97 in driven to turn the eccentric pin 99 from the engine brake taking-off angular position $B_0$ in the direction of the arrow $X_1$ shown in FIG. 7. The arrival of the contact surfaces 89a of the engine brake regulating lever 89a at the reference position $A_1$ where the contact surfaces 89a are in contact with the flanged collar 92 is detected through the detection of, for example, the increase of current flowing through the electric motor 97. The reference angular position $B_3$ of the eccentric pin 99 attached to the drive shaft 98 of the electric motor 97 is detected by the potentiometer 106. The reference angular position $B_1$ thus detected is a new reference angular position $B_1$ corresponds to a new reference position $A_1$, i.e., a reference position determined by learning. Data stored in the storage device is updated by using the new reference angular position $B_1$. The support plate 47 and the movable sheave 42 of the drive pulley 26 are moved by the distance $W_2$ from the new reference position $A_1$ when applying engine brake after the main switch 107 has been closed to operate the vehicle for the next time.

(3) Engine Brake Control According to Traveling Speed

When it is decided, on the basis of data provided by the speed sensor 110 shown in FIG. 9, that the vehicle is traveling forward at a very low traveling speed of, for example, 3 km/h or below, the eccentric pin 99 attached to the drive shaft 98 of the electric motor 97 is returned to the engine brake taking-off angular position $B_0$ shown in FIG. 7 to return the contact surfaces 89a of the engine brake regulating lever 89 to the engine brake taking-off position $A_0$. Thus, engine brake is made ineffective while the vehicle is in forward travel at a very low traveling speed to prevent the engine from stalling.

(4) Control According to Deceleration

When deceleration G of the vehicle calculated from traveling speed is 0.4 or above, the eccentric pin 99 attached to the drive shaft 98 of the electric motor 97 is returned to the engine brake taking-off angular position $B_0$ shown in FIG. 7 to return the contact surfaces 89a of the engine brake regulating lever 89 to the engine brake taking-off position $A_0$. Thus, engine brake is made ineffective to prevent the engine from stalling when the vehicle is braked sharply.

(5) Control According to Traveling Direction

When the traveling direction sensor 111 shown in FIG. 9 senses the reverse travel of the vehicle, the eccentric pin 99 attached to the drive shaft 98 of the electric motor 97 is returned to the engine brake taking-off angular position $B_0$ shown in FIG. 7 to return the contact surfaces 89a of the engine brake regulating lever 89 to the engine brake taking-off position $A_0$. Thus, engine brake is made ineffective while the vehicle is in reverse travel.

(6) Control When Potentiometer is Out of Order

When the potentiometer 106 shown in FIG. 9 is out of order and is unable to give the position signal to the controller 105, the eccentric pin 99 attached to the drive shaft 98 of the electric motor 97 is returned toward the engine brake taking-off angular position $B_0$ to return the contact surfaces 89a of the engine brake regulating lever 89 toward the engine brake taking-off position $A_0$, for example, for three seconds. Thus, the contact surfaces 89a are moved automatically toward the engine brake taking-off position $A_0$ for a time about half the time necessary for moving the eccentric pin 99 from the engine brake taking-off angular position $B_0$ to the engine brake applying angular position $B_3$ to take off engine brake substantially so that the dragging of the engine brake regulating lever 89 can be avoided.

[Basic Operation of Variable-Speed V-Belt Drive]

As shown in FIG. 6, the flyweights 45 of the drive pulley 26 are inoperative, and the contact surfaces 89a of the engine brake regulating lever 89 are kept at the engine brake taking-off position $A_0$ while the engine 3 is stopped. Thus, the drive pulley 26 is unable to transmit power to the V belt 29.

As engine speed increases after the engine has been started, the flyweights 45 of the drive pulley 26 are turned by centrifugal force so as to shift the movable sheave 42 to the left. Consequently, the V belt 29 is compressed between the fixed sheave 41 and the movable sheave 42 of the drive pulley 26, and power is transmitted from the drive pulley 26 through the V belt 29 to the driven pulley 28. The movable sheave 42 of the drive pulley 26 moves axially according to the variation of engine speed or load on the engine for automatic speed changing operation.

[Engine Brake Control Procedure]

Figure 12:
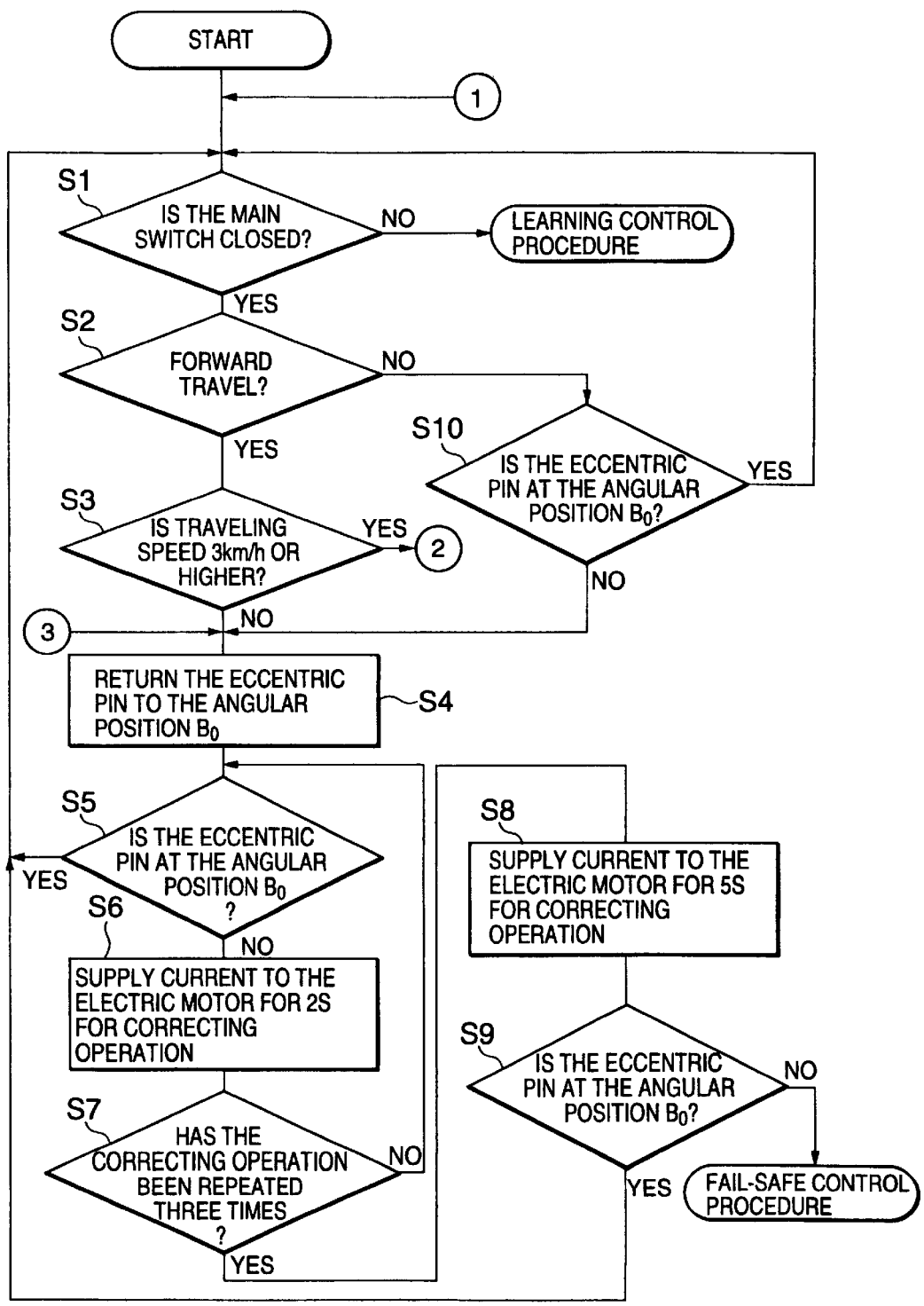
FIG. 12 is a flow chart of assistance in explaining an engine brake taking-off control operation included in an engine brake controlling method according to an embodiment of the present invention.

Referring to FIG. 12 showing a flow chart of assistance in explaining an engine brake taking-off control operation included in an engine brake control procedure, a query is made in step S1 to see whether or not the main switch 107 is closed. If the response in step S1 is negative, the learning control operation is executed. If the response in step S1 to affirmative, step S2 is executed.

In step S2, a query is made to see whether the vehicle is in forward travel or in reverse travel. When the vehicle is in forward travel, the response in step S2 is affirmative and step S3 is executed. When the vehicle is in reverse travel, the response in step S2 is negative and the program goes to step S10.

Figure 13:
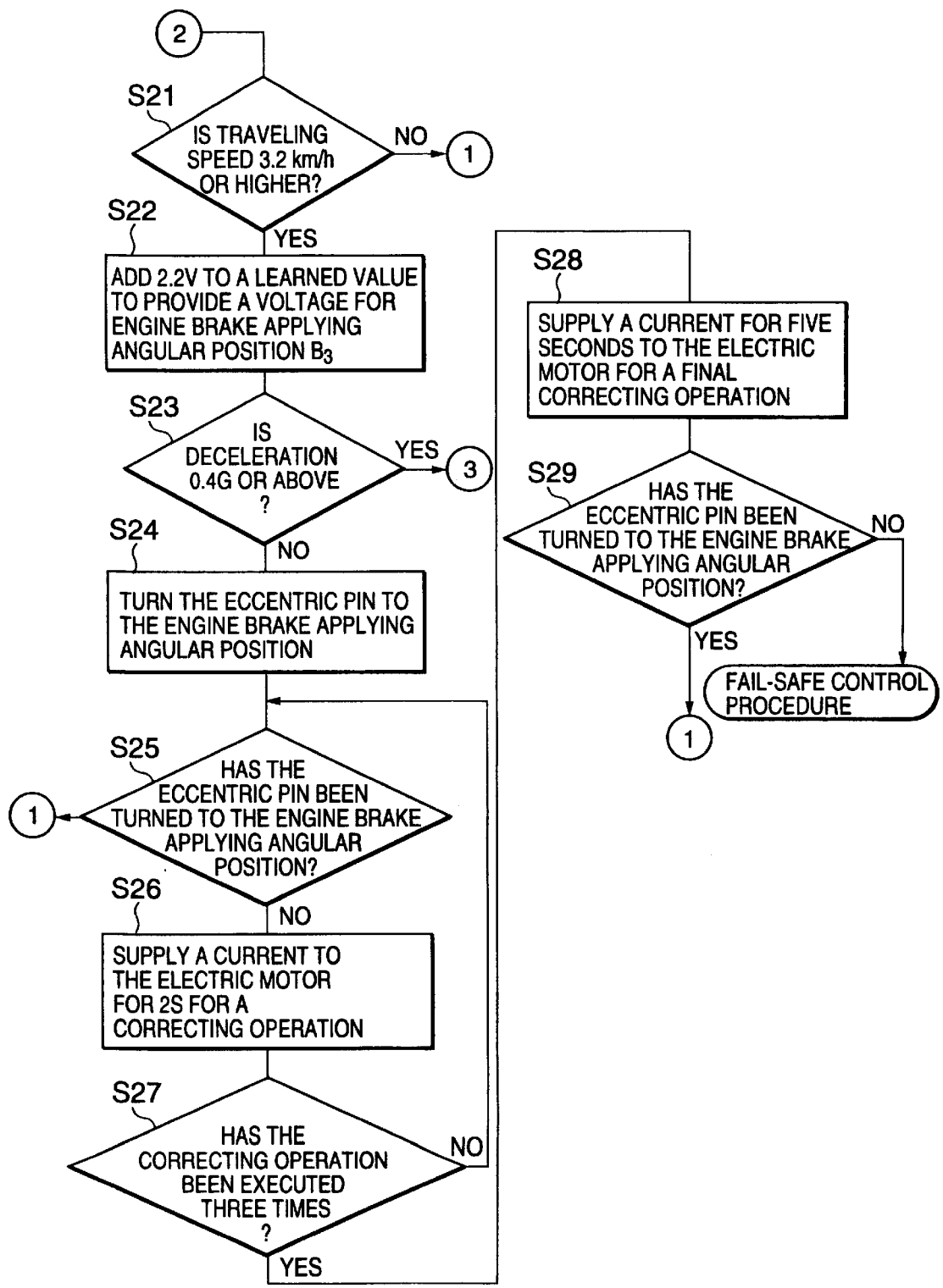
FIG. 13 is a flow chart of assistance in explaining an engine brake control operation included in the engine brake controlling method according to the embodiment of the present invention.

In step S3, a query is made to see whether the traveling speed is 3 km/h or above. When the response in step S3 is negative, i.e., when the vehicle is traveling forward at a traveling speed below 3 km/h, the program goes to step S4. In step S4, the electric motor 97 is driven to turn the eccentric pin 99 to the engine brake taking-off angular position $B_0$. Consequently, the contact surfaces 89a of the engine brake regulating lever 89 are moved to the engine brake taking-off position $A_0$ to make engine brake ineffective. When the response in step S3 is affirmative, the program goes through an exit point ② to step S21 (FIG. 13).

A query is made in step S10 to see if the eccentric pin 99 attached to the drive shaft 98 of the electric motor 97 is at the engine brake taking-off angular position $B_0$ corresponding to the engine brake taking-off position $A_0$ for the contact surfaces 89a with the vehicle in reverse travel. If the response in step S10 is affirmative, it is decided that engine brake is ineffective and the program returns to step S1. If the response in step S10 is negative, it is decided that engine brake is effective, and step S4 is executed to return the eccentric pin 99 attached to the drive shaft 98 of the electric motor 97 to the engine brake taking-off angular position $B_0$ corresponding to the engine brake taking-off position $A_0$ for the contact surfaces 89a.

After the eccentric pin 99 has been returned to the engine brake taking-off angular position $B_0$ in step S4, a query is made in step S5 to see if the eccentric pin 99 attached to the drive shaft 98 of the electric motor 97 has been correctly returned to the engine brake taking-off angular position $B_0$ corresponding to the engine brake taking-off position $A_0$ for the contact surfaces 89a. If the response in step S5 is affirmative, the program returns to step S1. It the response in step S5 is negative, i.e., if the eccentric pin 99 has not been correctly returned to the engine brake taking-off angular position $B_0$, a current is supplied to the electric motor 97 for two seconds for a correcting operation to return the eccentric pin 99 attached to the drive shaft 98 of the electric motor 97 correctly to the engine brake taking-off angular position $B_0$ in step S6.

The correcting operation in step S6 drives the shaft 98 of the electric motor 97 for turning in the direction of the arrow $X_1$ when the eccentric pin 99 has been turned in a direction opposite to the direction of the arrow $X_1$ beyond the engine brake taking-off angular position $B_0$, or drives the shaft 98 of the electric motor 97 for turning in the direction opposite to the direction of the arrow $X_1$ when the eccentric pin 99 has not been correctly returned to the engine brake taking-off angular position $B_0$.

In step S7 a query is made to see if the correcting operation has been executed three times. If the response in step S7 is negative, i.e., if the correcting operation has been executed once or twice, the program returns to step S5, If the response in step S7 is affirmative, i.e., if the correcting operation has been executed three times, the program goes to step S8. In step S8, a current is supplied for five seconds to the electric motor 97 for a final correcting operation, and a query is made in step S9 to see if the eccentric pin 99 has been returned to the engine brake taking-off angular position $B_0$. If the response in step S9 is affirmative, it is decided that the correcting operation has been correctly completed and the program returns to step S1. If the response in step S9 is negative, it is decided that there is some trouble in the vehicle and a fail-safe control procedure is executed.

FIG. 13 shows a flow chart of assistance in explaining an engine brake application control operation included in the engine brake control procedures. When the response in step S3 (FIG. 12) is affirmative, i.e., when the vehicle is traveling forward at a traveling speed not lower than 3 km/h, the programs goes to step S21 (FIG. 13). A query is made in step S21 to see whether the traveling speed is not lower than 3.2 km/h. The program returns to step S1 if the response in step S21 is negative or goes to step S22 when the response in step S21 is affirmative.

In step S22, a learned value is a voltage provided by the potentiometer 106 in a state where the contact surfaces 89a of the engine brake regulating lever 89 is set in contact with the flanged collar 92 at the reference position $A_1$ corresponding to the reference angular position $B_1$ of the eccentric pin 99 by the learning operation of the electric motor 97. In step S22, a voltage corresponding to the distance $W_2$ (angle $\theta_2$) for which the contact surfaces 89a of the engine brake regulating lever 89 are to be moved axially, such as 2.2 V, is added to the learned value to provide a voltage for the engine brake applying angular position $B_3$.

In step S23, a query is made to see if deceleration is 0.4 G or above. If the response in step S3 is affirmative due to the sharp braking of the vehicle or the like, the program goes through an exit point ③ to step S4 (FIG. 12) to return the eccentric pin 99 to the engine brake taking-off angular position $B_0$ by operating the motor 97. If the response in step S23 is negative, the eccentric pin 99 is turned to the engine brake applying angular position $B_3$ by operating the electric motor 97 in step S24. Consequently, the contact surfaces 89a of the engine brake regulating lever 89 are moved to the engine brake applying position $A_3$ to apply engine brake, and then the program goes to step S25.

A query is made in step S25 to see whether the eccentric pin 99 has been turned to the engine brake applying angular position $B_3$. A current is supplied to the electric motor 97 for two seconds for a correcting operation in step S26 if the response in step S25 is negative or it is decided that the correcting operation has been correctly completed and the program returns to step S1 (FIG. 12) if the response in step S25 is affirmative.

After the correcting operation has been completed in step S26, a query is made in step S27 to see if the correcting operation has been executed three times. If the response in step S27 is negative, i.e., if the correcting operation has been executed once or twice, the program returns to step S25. If the response in step S27 is affirmative, i.e., if the correcting operation has been executed three times, the program goes to step S28. In step S28, a current is supplied for five seconds to the electric motor 97 for a final correcting operation, and a query is made in step S29 to see if the eccentric pin 99 has been turned to the engine brake applying angular position $B_3$. If the response in step S29 is affirmative, it is decided that the correcting operation has been correctly completed to apply engine brake and the program returns to step S1 (FIG. 12). If the response in step S29 is negative, i.e., if the eccentric pin 99 has not been turned to the engine brake applying angular position $B_3$, it is decided that there is some trouble in the vehicle and the fail-safe control procedure is executed. The fail-safe control procedure includes turning on, for example, the abnormal engine brake warning lamp included in the pilot lamps 102 shown in FIG. 1.

Figure 14:
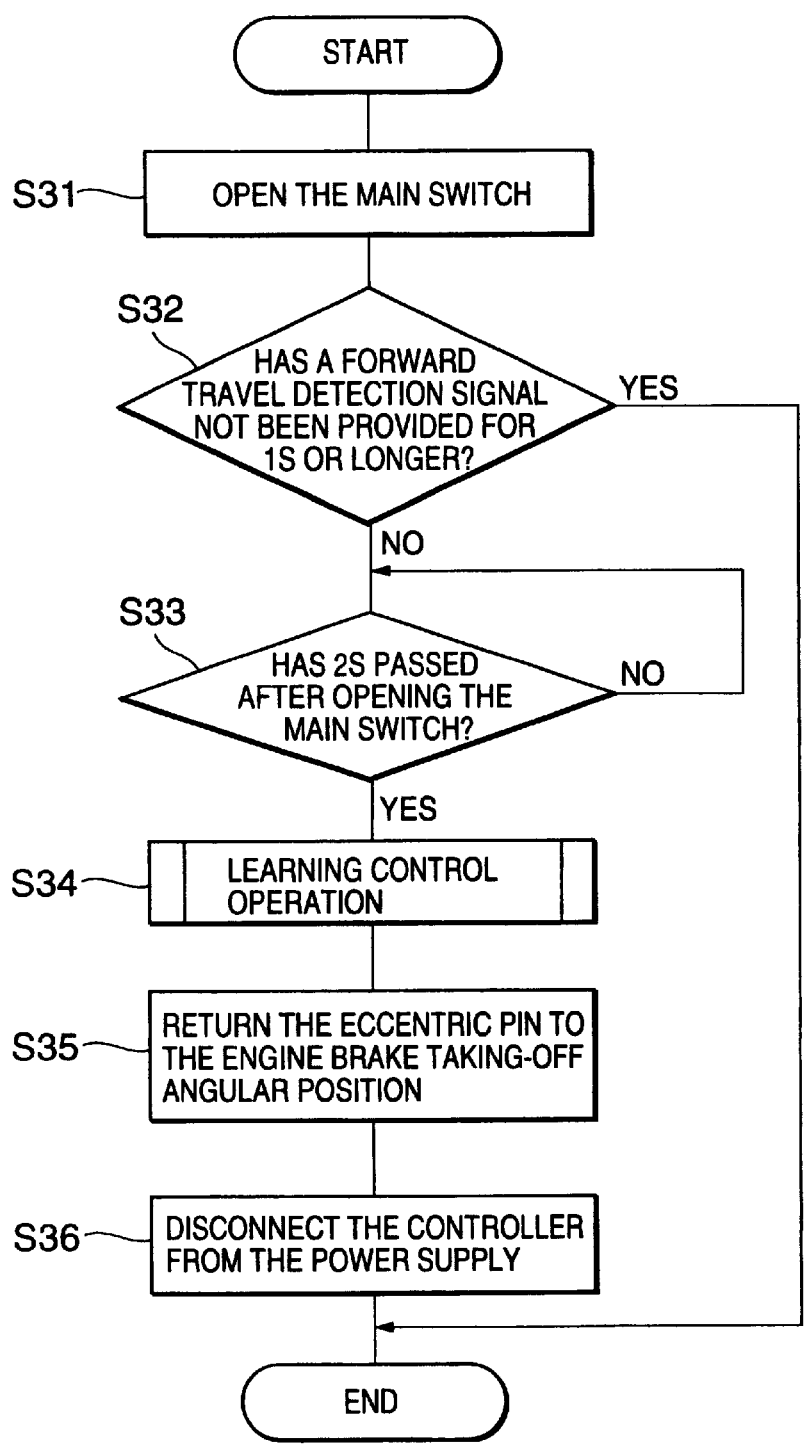
FIG. 14 is a flow chart of a learning control operation included in the engine brake controlling method according to the embodiment of the present intention.

Referring to FIG. 14 showing a flow chart of a learning control operation, the main switch 106 is opened in step S31 and a query is made in step S32 to see if a forward travel detection signal has not been generated for one second or longer. It is decided that it is possible that the vehicle is traveling forward and the program goes to step S36 if the response in step S32 is affirmative. In step S36, the controller 105 is disconnected from the power supply and the program is ended. If the response in step S32 is negative, i.e., if the forward travel detection signal has not been detected for one second or longer, it Is decided that the vehicle is not in forward travel and a query is made in step S33 to see whether two seconds has passed after opening the main switch 106, i.e., to see whether the engine has been stopped.

Step S33 is repeated until the time elapsed after opening the main switch 106 exceeds two seconds. If the response in step S33 is affirmative it is decided that the engine is stopped and the program goes to step S34 to execute the learning control operation.

After the learning control operation has been completed in step S34, the electric motor 97 is operated to return the eccentric pin 99 to the engine brake taking-off angular position $B_0$ corresponding to the engine brake taking-off position $A_0$ to make engine brake ineffective in step 35, the controller 105 is disconnected from the power supply in step S36, and then the program is ended.

Figure 15:
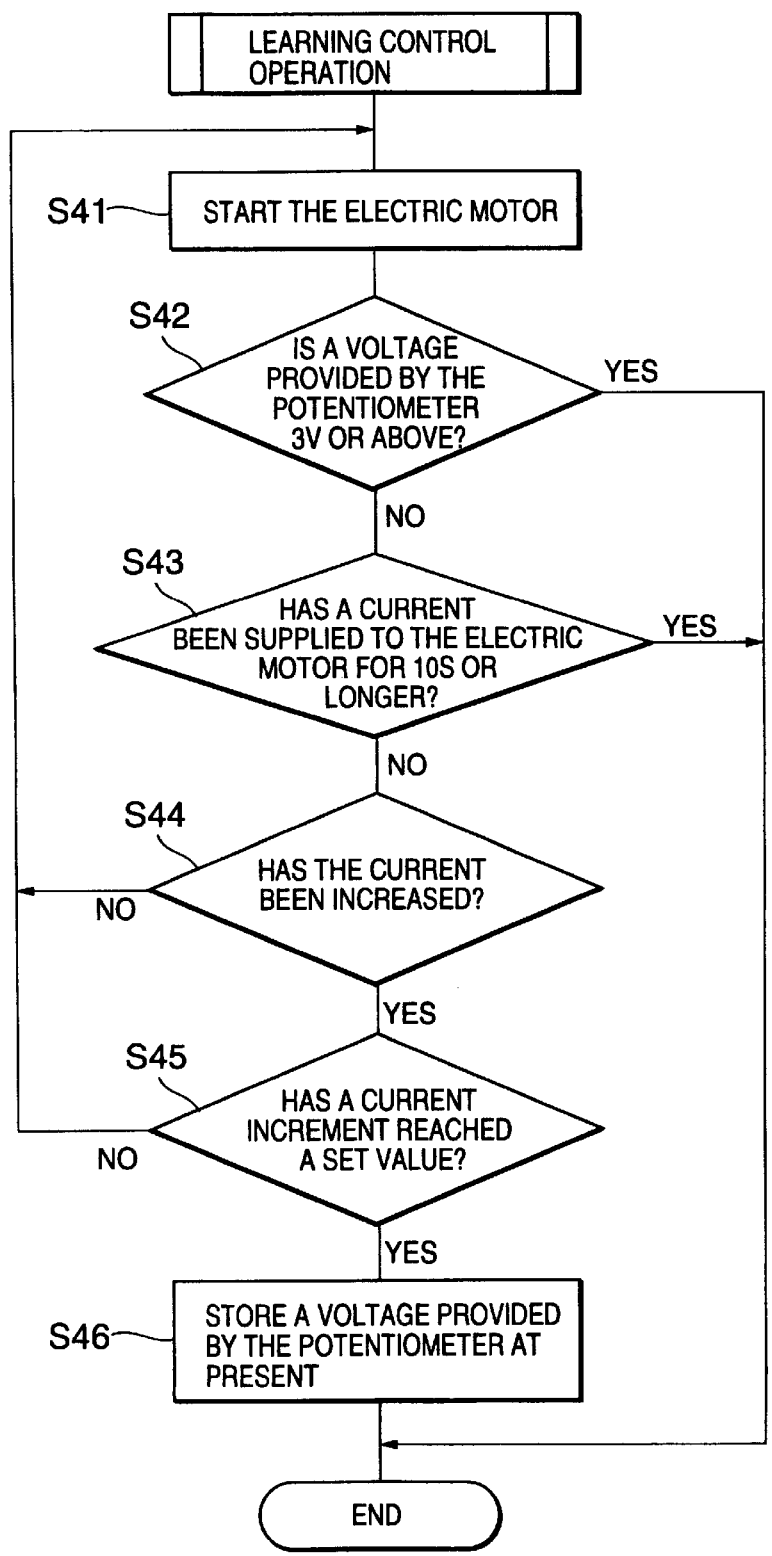
FIG. 15 is a flow chart of a learning control procedure included in the engine brake controlling method according to the embodiment of the present invention.

Referring to FIG. 15 showing a flow chart of a learning control procedure, the electric motor 97 is started in step S41 when the main switch is opened and the learning control operation is invoked in step S34 (FIG. 14), then, the program goes to step 42.

In step S42, a query is made to see if a voltage provided by the potentiometer 106 is 3 V or above corresponding to an angular position at an angle of 180° from the engine brake taking-off angular position $B_0$. It is decided that the voltage is excessively high and the program is ended it the response in step S42 is affirmative, i.e., if the voltage is 3 V or above.

If the response in step S42 is negative, a query is made in step S43 to see a current has been supplied to the electric motor 97 for 10 s or longer. It is decided that a current supply time has elapsed and the program is ended if the response in step S43 in affirmative.

If the response in step S43 is negative, a query is made in step S44 to see if the current has been increased. The program returns to step S41 to restart the electric motor 97 if the response in stop S44 is negative.

If the response in step S44 is affirmative, a query in made in step S45 to see if a current increment has reached a set value. It is decided that the electric motor 97 is stopped with the eccentric pin 99 located at the reference angular position $B_1$ and the program goes to step s46 if the response in step S45 is affirmative or it is decided that the eccentric pin 99 is not at the reference angular position $B_1$ and the program returns to step S41 if the response in step S45 is negative. In step S46, a voltage provided by the potentiometer 106 at present is regarded as a voltage corresponding to the reference angular position $B_1$ corresponding to the reference position $A_1$ and the data on the reference angular position stored in the storage device is updated.

Figure 16:
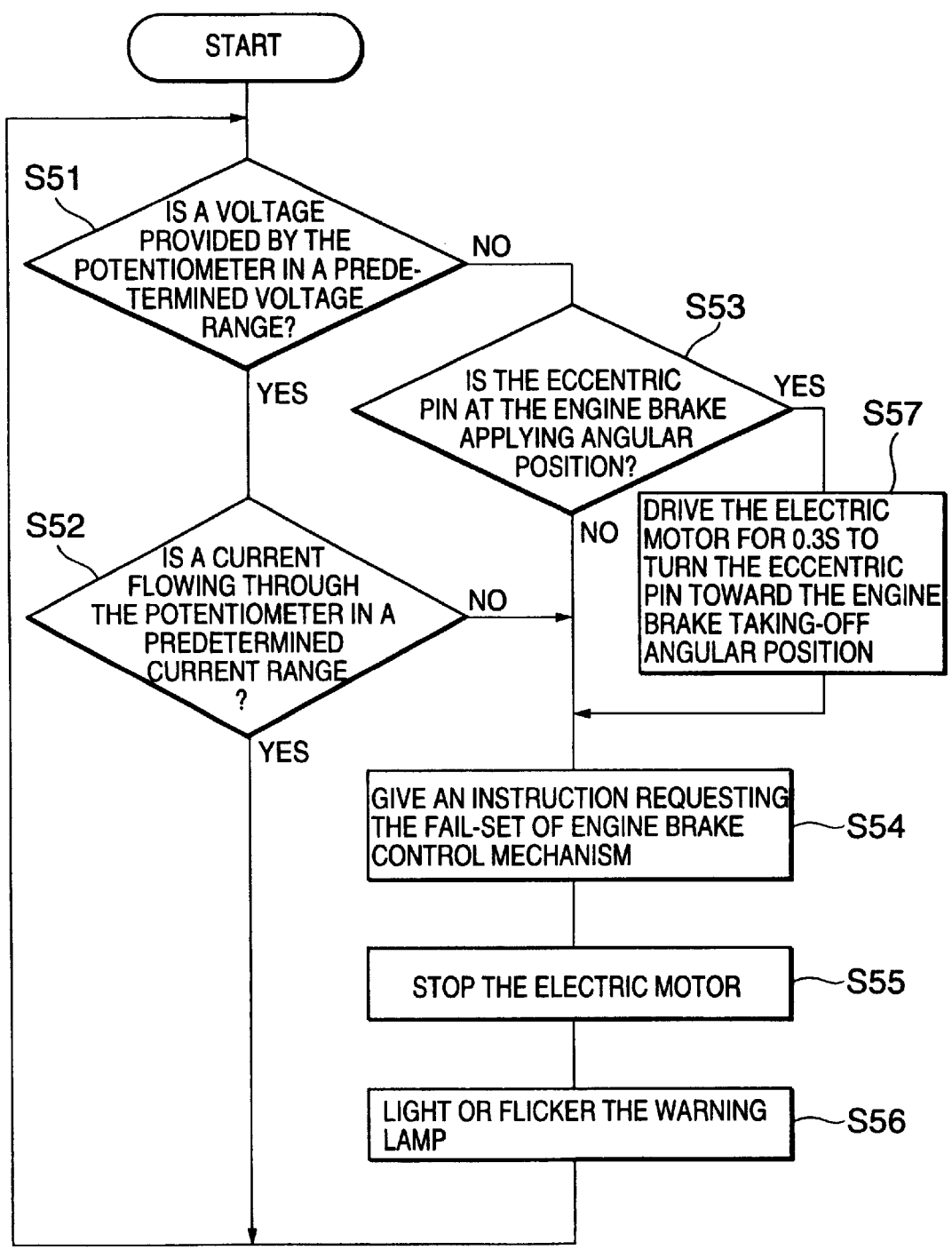
FIG. 16 is a flow chart of a fail-safe control procedure included in the engine brake controlling method according to the embodiment of the present invention.

Referring to FIG. 16 showing a flow chart of the fail-safe control procedure, a query is made in step S51 to see if a voltage provided by the potentiometer 106 is in a predetermined voltage range. The program goes to step S52 if the response in step S51 is affirmative or the program goes to step S53 if the response in step S51 is negative.

A query is made in step S52 to see if a current flowing through the potentiometer 106 is in a predetermined current range. The program returns to step S51 if the response in step S52 is affirmative or the program goes to step S54 it the response in step S52 is negative.

If the voltage provided by the potentiometer 106 is outside the predetermined voltage range, a query is made in step S53 to see if the eccentric pin 99 attached to the drive shaft 98 of the electric motor 97 is at the engine brake applying angular position $B_3$. It is decided that engine brake is ineffective and the program goes to step 554 if the response in step S53 in negative or the program goes to step S57 if the response in step S53 is affirmative. In step S57, the electric motor 97 is driven for 0.3 s to turn the eccentric pin 99 toward the engine brake taking-off angular position $B_0$, and then the program goes to step S54.

When the program goes from step S52, S53 or S57 to step S54, the potentiometer 106 is malfunctioning. Therefore an instruction requesting the fail-set of engine brake control mechanism is given in step S54 and the electric motor 97 is stopped in step S55 and the warning lamp is lighted or flickered in step S56.

The present invention is applicable to an engine brake control mechanism employing an engine brake control cam instead of the engine brake regulating lever. The engine brake control cam is disposed opposite to the flanged collar 92 and is driven by the electric motor.

Although the foregoing embodiment uses the position where the contact surfaces 89a of the engine brake regulating lever 89 come into contact with the flanged collar 92 as the reference position $A_1$ (FIG. 7), a position $A_{1a}$ corresponding to a position to which the support plate 47 is shifted to the left by a distance corresponding to an axial play between the movable sheave 42 and the V belt 29 (FIG. 6) may be used as the reference position. When the position $A_{1a}$ is used as the reference position, the position $A_{1a}$ is stored as the reference position in the storage device of the controller 105 during the learning operation of the electric motor 97, and a new engine brake applying position $A_3$ is determined by adding a predetermined distance to the position $A_{1a}$. In the learning operation, the voltage applied to the electric motor 97 (current flowing through the electric motor 97) increases sharply due to the sharp increase of resistance against the movement of the engine brake regulating lever 89 at a first moment when the contact surfaces 89a of the engine brake regulating lever 89 are brought into contact with the flanged collar 92 and a second moment when the movable sheave 42 engages with the V belt 29. The position of the contact surfaces 89a of the engine brake regulating lever 89 at the second moment is measured and is stored as a reference position in the storage device.

As apparent from the foregoing description, the embodiments of the present invention have the following effects.

(1) The vehicle in provided with the engine brake control apparatus including the engine brake regulating lever 89, i.e., an engine brake regulating member, for changing the maximum V-groove width of the drive pulley, and the electric motor 97, i.e., an electric actuator, for driving the engine brake regulating lever 89, and capable of controlling engine brake by changing the maximum V-groove width of the drive pulley, the potentiometer 106, i.e., a position sensor, for detecting the position of the engine brake regulating member to determine the axial position of the movable sheave 42, and the controller 105. A position signal provided by the potentiometer 106 is sent to the controller 105, and the position of the engine brake regulating lever 89 is controlled by the electric motor 97 on the basis of the position signal. Thus engine brake can be applied or taken off as the occasion demands, the dislocation of the engine brake regulating lever 89 from a correct position can be automatically corrected in a state where engine brake is effective to maintain the effect of engine brake constant.

(2) The position where the contact surface of the engine brake regulating lever 89 comes into contact with, for example the flanged collar 92 associated with the movable sheave 42 of the drive pulley 26 is detected by the learning operation of the electric motor 97, the controller 105 stores the aforesaid position as the reference position $A_1$, and the maximum V-groove width of the drive pulley 26 in controlled with reference to the reference position. Thus, the maximum V-groove width of the drive pulley 26 can be easily adjusted without requiring manual adjustment according to the existing position and dimensions of the movable sheave 42 of the drive pulley 26.

(3) The position where the engine brake regulating lever 89 is located when the movable sheave 42 of the drive pulley 26 comes into contact with the V belt is detected by the learning operation of the electric actuator 97, the controller 105 stores the aforesaid position as the reference position $A_{1a}$, and the maximum V-groove width of the drive pulley 26 is controlled with reference to the reference position $A_{1a}$. Thus the position of the movable sheave 42 of the drive pulley 26 for the maximum V-groove width of the drive pulley 26 can be determined regardless of clearance between the movable sheave 42 of the drive pulley 26 and the V belt 29, which further enhances the effect on maintaining the effect of engine brake constant.

(4) The electric motor 97 is operated for learning when the main switch of the vehicle is opened. Thus the engine brake applying position $A_3$ of the engine brake regulating lever 89 can be automatically corrected every time the engine is stopped, the movable sheave 42 of the drive pulley 26 can be always held at a proper engine brake applying position $A_3$ to prevent the reduction of the effect of engine brake.

What is claimed is:

1. An engine brake control method for a vehicle provided with a variable-speed V-belt drive including a drive pulley having a movable sheave, a driven pulley, and a V belt extended between the drive pulley and the driven pulley, comprising:

detecting a position of an engine brake regulating member by a detector, the engine brake regulating member limiting an extent of an outward axial movement of the movable sheave of the drive pulley so as to regulate a maximum V-groove width of the drive pulley; and controlling a position of the engine brake regulating member by a controller based on a position signal sent from the detector to the controller, the controller operating an actuator to move the engine brake regulating member so that the engine brake regulating member is located at a desired position relative to the movable sheave of the drive pulley.

2. The engine brake control method according to claim 1, wherein the detecting step detects a reference position of the engine brake regulating member where the engine brake regulating member is located when the engine brake regulating member comes into contact with the movable sheave; and wherein the controlling step controls a position of the engine brake regulating member using the reference position detected in the detecting step as a reference.

3. The engine brake control method according to claim 1, wherein the detecting step detects a reference position of the engine brake regulating member where the engine brake regulating member is located when the movable sheave, which is pressed inward by the engine brake regulating member, comes into contact with the V belt; and wherein the controlling step controls a position of the engine brake regulating member using the reference position detected in the detecting step as a reference.

4. The engine brake control method according to claim 2, wherein the detecting step is executed when a main switch of the vehicle is opened.

5. The engine brake control method according to claim 3, wherein the detecting step is executed when a main switch of the vehicle is opened.

6. The engine brake control method according to claim 1, wherein the actuator is electrically driven.

7. An engine brake control apparatus for a vehicle provided with a variable-speed V-belt drive including a drive pulley having a movable sheave, a driven pulley, and a V belt extended between the drive pulley and the driven pulley, comprising:

an engine brake regulating member of limiting an extent of an outward axial movement of the movable sheave of the drive pulley so as to regulate a maximum V-groove width of the drive pulley;

a detector for detecting a position of the engine brake regulating member;

an actuator for moving the engine brake regulating member; and a controller for controlling a position of the engine brake regulating member by operating the actuator based on a position signal sent from the detector so that the engine brake regulating member is located at a desired position relative to the movable sheave of the drive pulley.

8. The engine brake control apparatus according to claim 7, wherein the detector detects a reference position of the engine brake regulating member where the engine brake regulating member is located when the engine brake regulating member comes into contact with the movable sheave; and wherein the controller controls a position of the engine brake regulating member using the reference position detected by the detector as a reference.

9. The engine brake control apparatus according to claim 7, wherein the detector detects a reference position of the engine brake regulating member where the engine brake regulating member is located when the movable sheave, which is pressed inward by the engine brake regulating member, comes into contact with the V belt; and wherein the controller controls a position of the engine brake regulating member using the reference position detected by the detector as a reference.

10. The engine brake control apparatus according to claim 8, wherein the detector detects the position of the engine brake regulating member when a main switch of the vehicle is opened.

11. The engine brake control apparatus according to claim 9, wherein the detector detects the position of the engine brake regulating member when a main switch of the vehicle is opened.

12. The engine brake control apparatus according to claim 7, wherein the actuator is electrically driven.

* * * * *